US009160155B2

(12) United States Patent
Ishikawa et al.

(10) Patent No.: US 9,160,155 B2
(45) Date of Patent: Oct. 13, 2015

(54) BUS BAR MODULE

(71) Applicant: Yazaki Corporation, Tokyo (JP)

(72) Inventors: Masahiro Ishikawa, Kariya (JP);
Shigeyuki Ogasawara, Kakegawa (JP);
Takao Syouji, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/315,433

(22) Filed: Jun. 26, 2014

(65) Prior Publication Data

US 2014/0305698 A1    Oct. 16, 2014

Related U.S. Application Data

(63) Continuation of application No. PCT/JP2013/052287, filed on Jan. 24, 2013.

(30) Foreign Application Priority Data

Jan. 24, 2012  (JP) ................................. 2012-012198

(51) Int. Cl.
| *H02G 5/06* | (2006.01) |
| *H02G 5/00* | (2006.01) |
| *H01M 2/10* | (2006.01) |
| *H01M 2/20* | (2006.01) |
| *H01M 2/12* | (2006.01) |
| *H01M 10/0525* | (2010.01) |

(52) U.S. Cl.
CPC ............... *H02G 5/00* (2013.01); *H01M 2/1077* (2013.01); *H01M 2/206* (2013.01); *H01M 2/1252* (2013.01); *H01M 10/0525* (2013.01); *H01M 2220/20* (2013.01); *Y02T 10/7011* (2013.01)

(58) Field of Classification Search
USPC ........... 174/72 B, 68.2, 69, 71 R, 72 R, 71 B, 174/75 F, 88 B, 70 B, 99 B, 129 B, 133 B, 261, 174/267
See application file for complete search history.

(56) References Cited

U.S. PATENT DOCUMENTS 6,261,719 B1 *  7/2001  Ikeda et al. ................... 429/211
6,275,003 B1    8/2001  Marukawa et al.

FOREIGN PATENT DOCUMENTS

| EP | 1 059 682 A1 | 12/2000 |
| JP | 2003-100273 A | 4/2003 |

(Continued)

OTHER PUBLICATIONS

International Search Report (PCT/ISA/210) dated Jun. 10, 2013 from the International Searching Authority in counterpart International Application No. PCT/JP2013/052287.

(Continued)

Primary Examiner — Tremesha S Willis
(74) Attorney, Agent, or Firm — Sughrue Mion, PLLC

(57) ABSTRACT

A bus bar module includes a holding member for holding the plural bus bars with a mutual distance between the bus bars maintained. The holding member includes a first holding member for holding the plural bus bars in one electrode line of the plural battery cells, a second holding member for holding the plural bus bars in the other electrode line of the plural battery cells, and a joining member for structurally joining the first holding member to the second holding member. The joining member is formed in an arch shape upwardly projected from inside ends of the first holding member and the second holding member. The joining member has a rigid part adapted to maintain the arch shape and a flexible part adapted to vertically bend by a load from above.

3 Claims, 4 Drawing Sheets

(56) References Cited

FOREIGN PATENT DOCUMENTS

| | | |
|---|---|---|
| JP | 2010-170884 A | 8/2010 |
| JP | 2011-65749 A | 3/2011 |

OTHER PUBLICATIONS

Written Opinion (PCT/ISA/237) dated Jun. 10, 2013 from the International Searching Authority in counterpart International Application No. PCT/JP2013/052287.

* cited by examiner

BUS BAR MODULE

CROSS REFERENCE TO RELATED APPLICATIONS

This application is a continuation of PCT application No. PCT/JP2013/052287, which was filed on Jan. 24, 2013 based on Japanese Patent Application (No. 2012/012198) filed on Jan. 24, 2012, the contents of which are incorporated herein by reference.

BACKGROUND OF THE INVENTION

1. Field of the Invention

The present invention relates to a bus bar module, and particularly to a bus bar module for connecting plural battery cells of an assembled battery in series.

2. Description of the Related Art

As a bus bar module attached to an assembled battery configured by stacking plural battery cells, a bus bar module configured to have plural terminals connected to each electrode of a battery cell, plural electric wires connected to each terminal, a plate and a cover is known conventionally (for example, see PTL 1).

In the bus bar module described in PTL 1, the plate has plural terminal receiving parts and plural electric wire receiving parts, and the cover is configured to cover an opening by being attached to the electric wire receiving parts by sliding the cover inside an opening of the electric wire receiving parts in a direction from the other end side toward one end side of a battery aggregate.

On the other hand, in recent years, adoption of a lithium-ion battery has been examined as an assembled battery of a hybrid vehicle or an electric vehicle. Since the lithium-ion battery may emit smoke due to overcharging etc., it is necessary to provide an upper surface of the assembled battery with a smoke-emitting duct.

CITATION LIST

Patent Literature

[PTL 1] JP-A-2011-65749

SUMMARY OF THE INVENTION

However, when the upper surface of the assembled battery is provided with the smoke-emitting duct in such a conventional bus bar module, in order to avoid interference with the smoke-emitting duct and also position the smoke-emitting duct in a regular position, it is contemplated to include a joining member for structurally joining one electrode line side of the bus bar module to a holding member (corresponding to the plate of Patent Reference 1) of the other electrode line side and form this joining member in an arch shape so as to stride over the smoke-emitting duct.

On the other hand, the assembled battery is often installed in small space in order to increase a trunk room or a cabin, and it is assumed that the assembled battery is subjected to a load from an upper panel etc.

As a result, when the arch-shaped joining member is subjected to a load from an upper portion, this load is transmitted to an electrode or a body of each battery cell of the assembled battery and particularly, the electrode of the battery cell may be deformed or damaged.

The invention has been implemented in order to solve the conventional problem as described above, and an object of the invention is to provide a bus bar module capable of preventing an electrode of an assembled battery from being deformed or damaged by a load from above without increasing installation space.

The object according to the invention is achieved by the following configurations.

(1) A bus bar module which is mounted in an assembled battery in which plural battery cells are arranged so as to alternately arrange polarities of electrodes and electrically connects mutually adjacent electrodes of the plural battery cells by plural bus bars so that the plural battery cells are electrically connected in series by the plural bus bars, comprising:
a holding member for holding the plural bus bars with a mutual distance between the bus bars maintained,
the holding member having:
a first holding member for holding the plural bus bars in one electrode line of the plural battery cells,
a second holding member for holding the plural bus bars in the other electrode line of the plural battery cells, and
a joining member for structurally joining the first holding member to the second holding member,
wherein the joining member is formed in an arch shape upwardly projected from inside ends of the first holding member and the second holding member, the joining member having a rigid part adapted to maintain the arch shape and a flexible part adapted to vertically bend by a load from above.

By this construction, when the joining member is subjected to a load from above, while maintaining the arch shape by the rigid part, the load is reduced by bending in the flexible part and the load can be prevented from being transmitted to the first holding member and the second holding member. Also, since the flexible part bends and the load can be reduced, it is unnecessary to increase a clearance between the joining member and a member of the upper part of the joining member, so that an increase in installation space can be prevented. Consequently, an electrode of the assembled battery can be prevented from being deformed or damaged by the load from above without increasing the installation space.

(2) In the bus bar module with the configuration of the above (1), the rigid part has a rib for rigid maintenance, and the flexible part is formed in a flat plate shape.

By this construction, the rigid part includes the rib and thereby rigidity can be given to the rigid part and also the flexible part is formed in the flat plate shape by eliminating the rib for rigid maintenance from the flexible part and thereby flexibility can easily be given to the flexible part.

(3) In the bus bar module with the configuration of the above (1) or (2), the flexible part is formed on a lower end of the joining member.

By this construction, in order to reduce a load in the flexible part arranged on the lower end of the joining member, the flexible part bends vertically and the general arch shape of the joining member can be maintained by the rigid part.

DETAILED DESCRIPTION OF THE EXEMPLARY EMBODIMENTS

An embodiment of a bus bar module according to the invention will hereinafter be described using the drawings.

Figure 1:
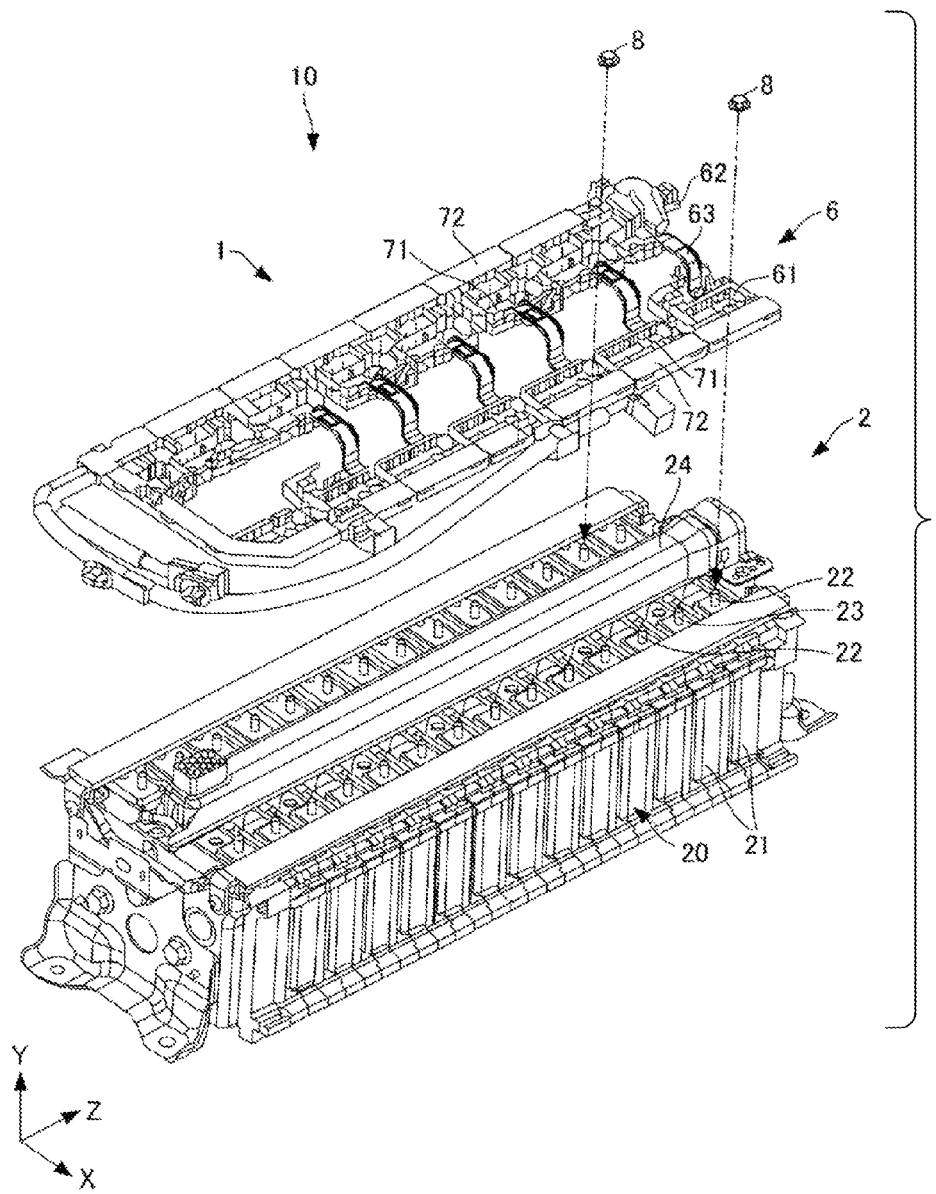
FIG. 1 is a perspective view showing a configuration of an assembled battery and a bus bar module according to the invention.
Figure 2:
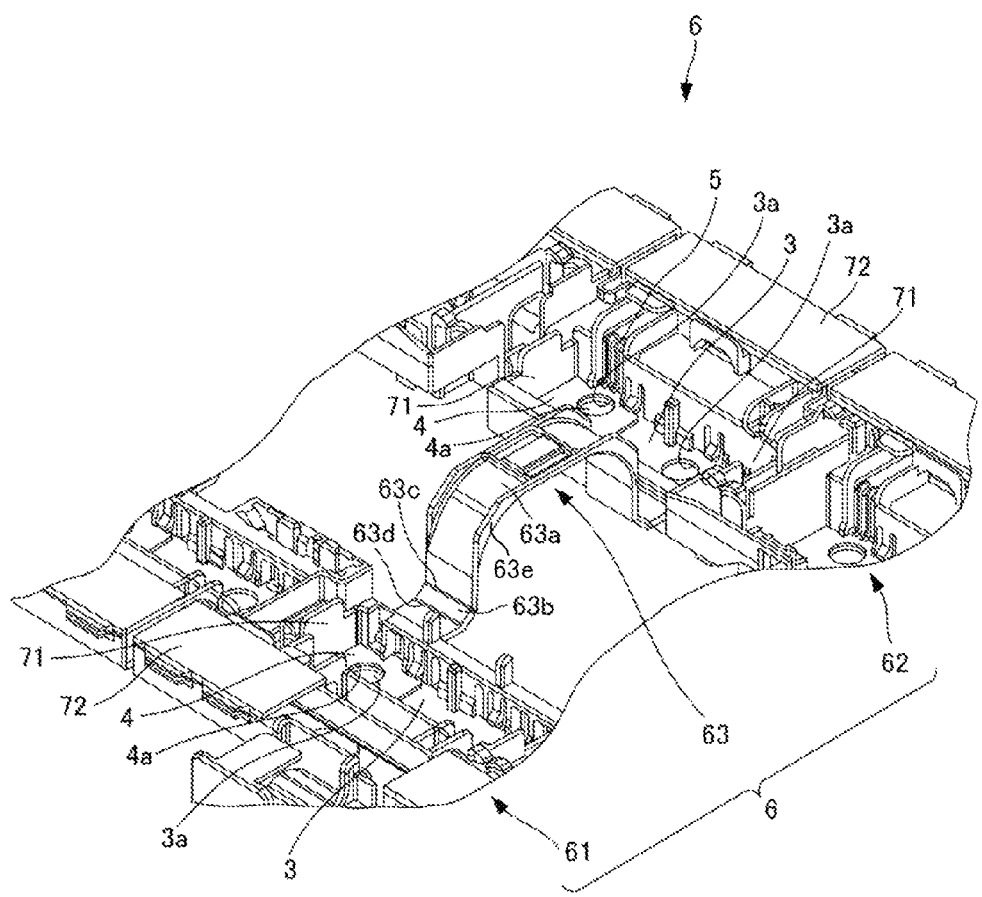
FIG. 2 is a perspective view showing a detailed configuration of the bus bar module according to the invention.
Figure 3:
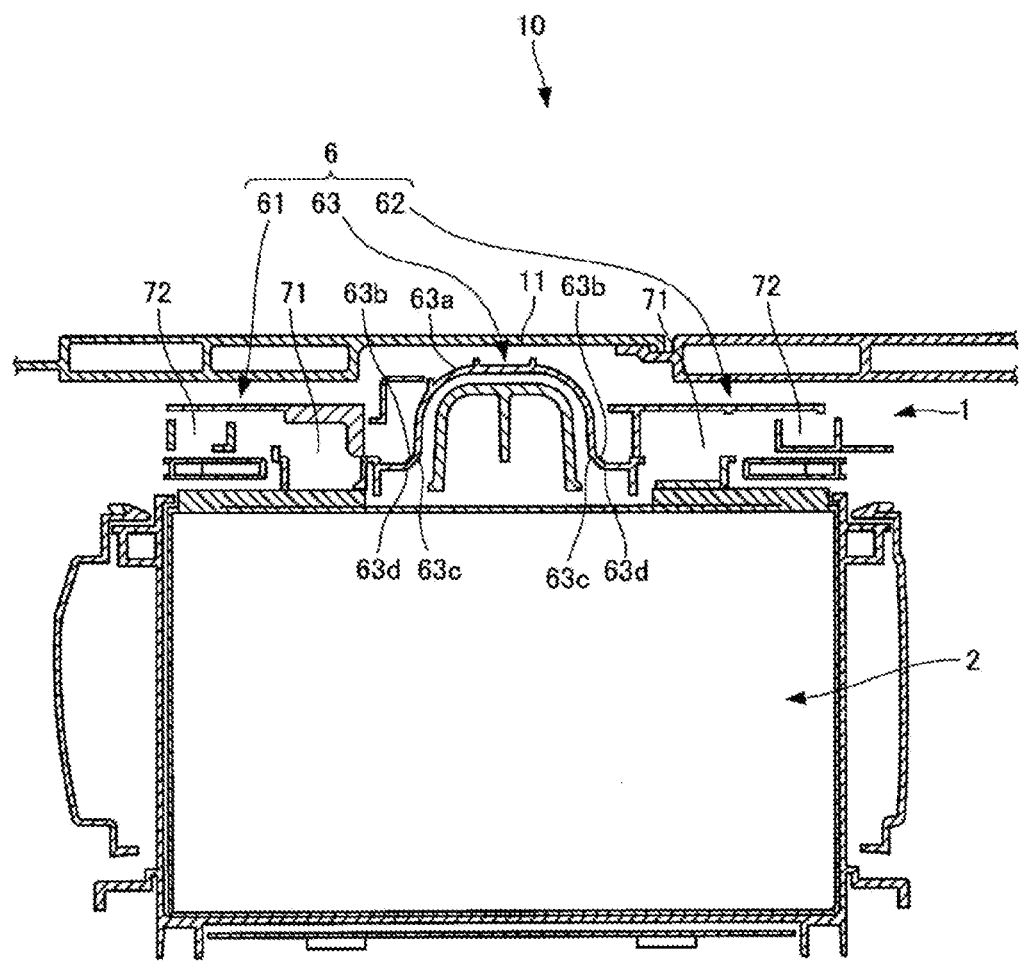
FIG. 3 is a sectional view showing a cross section in a joining member of the bus bar module of FIG. 2.

FIGS. 1 to 3 are views showing one embodiment of the bus bar module according to the invention.

First, a configuration is described. As shown in FIGS. 1 and 2, a bus bar module 1 of the invention is attached to an assembled battery 2 to construct a power source apparatus 10. The power source apparatus 10 is installed in, for example, an electric vehicle driven using an electric motor as a driving source or a hybrid vehicle driven with a combination of an engine and an electric motor, and supplies electric power to the electric motor.

In addition, the assembled battery 2 is formed by stacking battery cells (square batteries) having a positive electrode in one end and a negative electrode in the other end alternately in the opposite direction.

The assembled battery 2 is a battery fixed by mutually stacking plural battery cells 20. Each of the plural battery cells 20 has a battery cell body 21 with a rectangular parallelepiped shape, a positive electrode 22 and a negative electrode 23 respectively projected from one end and the other end of an upper surface of this battery cell body 21.

The plural battery cells 20 are stacked so that the positive electrodes 22 and the negative electrodes 23 are alternately arranged in a straight line along a stack direction of these battery cells 20. Concretely, electrode lines in which the positive electrodes 22 and the negative electrodes 23 are alternately arranged in the straight line are formed in each of one end and the other end of the upper surfaces of the battery cell bodies 21.

Also, an arrow Z in FIG. 1 shows a stack direction of the plural battery cells 20 and a longitudinal direction of the assembled battery 2, and an arrow X shows a width direction of each of the battery cells 20, that is, a width direction of the assembled battery 2, and an arrow Y shows a height direction of each of the battery cells 20, that is, a height direction of the assembled battery 2.

Also, the assembled battery 2 is installed in a vehicle in a direction in which the height direction (direction of arrow Y) is parallel to a direction of gravity. That is, in a state in which the assembled battery 2 is installed in the vehicle, the upper side along the direction of arrow Y in FIG. 1 becomes the upper side of the direction of gravity and the lower side along the direction of arrow Y becomes the lower side of the direction of gravity.

Also, in the state in which the assembled battery 2 is installed in the vehicle, the positive electrode 22 and the negative electrode 23 become projected from the upper surface of the battery cell body 21 of each of the battery cells 20 in the direction of arrow Y.

Also, an upper surface of the assembled battery 2 is provided with a smoke-emitting duct 24 between the electrode line of one end side and the electrode line of the other end side. The smoke-emitting duct 24 extends in the stack direction of the battery cells 20 while forming the lower surface in a semicircular cross-sectional shape opened in the side of the assembled battery 2, and is means for collecting smoke generated from each of the battery cells 20 and emitting the smoke to the outside.

The bus bar module 1 has plural bus bars 3 for electrically connecting the plural battery cells 20 in series, plural voltage detecting terminals 4 respectively stacked on each of the bus bars 3 and electrically connected to the bus bars 3, plural electric wires 5 respectively connected to each of the voltage detecting terminals 4, and a holding member 6 made of a synthetic resin for receiving the bus bars 3, the voltage detecting terminals 4 and the electric wires 5 and positioning the plural bus bars 3 and the plural voltage detecting terminals 4 in predetermined positions.

The bus bar 3 is obtained by, for example, pressing a metal plate, and is constructed so that two electrode insertion holes 3a into which any of the columnar positive electrode 22 and the negative electrode 23 of the mutually adjacent battery cells 20 are respectively inserted are formed in a metal plate with substantially a rectangular shape as shown in FIG. 2.

The positive electrode 22 formed on one side of the adjacent battery cells 20 is inserted into one side of the two electrode insertion holes 3a, and the negative electrode 23 formed on the other side of the adjacent battery cells 20 is inserted into the other side of the two electrode insertion holes 3a, and the bus bar 3 is attached to the positive electrode 22 and the negative electrode 23 and also is electrically connected to the positive electrode 22 and the negative electrode 23.

Also, the bus bar 3 is constructed so as to be fixed to the battery cells 20 by respectively screwing nuts 8 (see FIG. 1) into the positive electrode 22 and the negative electrode 23 inserted into the electrode insertion holes 3a.

The voltage detecting terminal 4 is obtained by, for example, pressing a metal plate, and is formed in a plate shape, and is configured to have an electrode insertion hole 4a into which one of the positive electrode 22 and the negative electrode 23 is inserted. In a state in which one of the positive electrode 22 and the negative electrode 23 is inserted into the electrode insertion hole 4a, the voltage detecting terminal 4 is stacked on the bus bar 3 and is electrically connected to the bus bar 3.

The electric wire 5 includes a conductive core wire and a coat part made of an insulating synthetic resin with which the core wire is coated. One end of the electric wire 5 is connected to the voltage detecting terminal 4 received inside a bus bar receiving part 71 of the holding member 6 and is cabled inside an electric wire cabling part 72 of the holding member 6 and the other end of the electric wire 5 is connected to a voltage detecting circuit (not shown) etc.

On the other hand, the holding member 6 is constructed so as to be formed in substantially a rectangular shape substantially equal to an upper surface shape of the assembled battery 2 when viewed as a whole, and also be stacked on the upper surface of the assembled battery 2, and is means for facilitating assembly to the assembled battery 2 by holding the plural bus bars 3 while maintaining a distance between the mutual bus bars 3.

The holding member 6 is provided with the plural bus bar receiving parts 71 mutually spaced along the direction of arrow Z and the plural electric wire cabling parts 72 annexed to the bus bar receiving parts 71 in the direction of arrow X in two lines, respectively.

Concretely, the holding member 6 includes a first holding member 61 for receiving and holding the plural bus bars 3 for electrically connecting the positive electrodes 22 and the negative electrodes 23 arranged in a line state in one side of the plural battery cells 20, a second holding member 62 for receiving and holding the plural bus bars 3 for electrically connecting the positive electrodes 22 and the negative electrodes 23 arranged in a line state in the other side of the plural battery cells 20, and a joining member 63 for structurally joining the first holding member 61 to the second holding member 62.

The first holding member 61 and the second holding member 62 respectively have the plural bus bar receiving parts 71 which respectively receive each of the bus bars 3 and each of the voltage detecting terminals 4 stacked on the bus bars 3 and are mutually spaced along the direction of arrow Z.

The first holding member 61 and the second holding member 62 are arranged on the upper surface of the assembled battery 2 in an opposed state across the smoke-emitting duct 24 located in the upper surface of the assembled battery 2.

Also, the first holding member 61 and the second holding member 62 have the electric wire cabling parts 72 which extend along an arrangement direction of the plural bus bar receiving parts 71 and also extend at a spacing in the direction of arrow Z parallel to the plural bus bar receiving parts 71 and receive the plural electric wires 5 connected to each of the voltage detecting terminals 4. In the first holding member 61 and the second holding member 62, the plural bus bar receiving parts 71 and the plural electric wire cabling parts 72 are joined and formed integrally.

Each of the bus bar receiving parts 71 is made of a bottom wall and a peripheral wall, and is formed in a box shape capable of fitting each of the bus bars 3 into the bottom, and an upper surface is opened. Each of the bus bar receiving parts 71 is constructed so as to receive each of the bus bars 3 and each of the voltage detecting terminals 4 stacked on the bus bars 3.

The plural bus bar receiving parts 71 are mutually spaced along a stack direction of the plural battery cells 20, that is, the direction of arrow Z. The mutually adjacent bus bar receiving parts 71 are respectively connected by a connection elastically deformable by, for example, molding a resin in a thin wall state, and therefore this accommodates a positional displacement between each of the bus bar receiving parts 71 and the positive electrode 22 or the negative electrode 23 of the battery cell 20 corresponding to this bus bar receiving part 71.

The plural electric wire cabling parts 72 are juxtaposed to the outside of the plural bus bar receiving parts 71 in the direction of arrow Z. Like the plural bus bar receiving parts 71, the plural electric wire cabling parts 72 are mutually spaced and the mutually adjacent electric wire cabling parts 72 are joined.

The mutually adjacent electric wire cabling parts 72 are respectively connected by a connection elastically deformable by, for example, molding a resin in a thin wall state, and this can vary a distance between the mutual electric wire cabling parts 72 corresponding to these bus bar receiving parts 71 according to variations in a distance between the mutually adjacent bus bar receiving parts 71, with the result that a positional displacement between each of the bus bar receiving parts 71 and the positive electrode 22 or the negative electrode 23 of the battery cell 20 corresponding to this bus bar receiving part 71 is accommodated.

The electric wire cabling part 72 is formed in a box shape made of an upper wall, a bottom wall and a peripheral wall, and the upper wall is constructed as a lid part openable and closable through a hinge.

The joining member 63 will be described in detail with reference to FIGS. 2 and 3. As shown in FIGS. 2 and 3, the joining member 63 is formed in an arch shape upwardly projected from the inside ends of the first holding member 61 and the second holding member 62, and is arranged in a state astride the smoke-emitting duct 24 so as to avoid the smoke-emitting duct 24 present in the upper surface of the assembled battery 2 and located between the first holding member 61 and the second holding member 62.

The upper end of the joining member 63 is arranged with a predetermined clearance created between the upper end and an upper frame 11 arranged over the joining member 63. As a result, even when the upper frame 11 bends downwardly by a load from above, the load from the upper frame 11 is prevented from being applied to the joining member 63 immediately.

In addition, when the joining member 63 is subjected to the load from the upper frame 11, this load is transmitted to the first holding member 61 and the second holding member 62 and a load may be applied to the positive electrode 22 and the negative electrode 23.

Also, the upper end of the joining member 63 is arranged with a predetermined clearance created between the upper end and an upper surface of the smoke-emitting duct 24 arranged under the joining member 63. As a result, even when the upper end of the joining member 63 is downwardly displaced by a load from the upper frame 11, the upper end of the joining member 63 is prevented from making contact with the smoke-emitting duct 24 immediately.

When the clearance created over the upper end of the smoke-emitting duct 24 is set large herein, the load from the upper frame 11 is more prevented from being applied to the joining member 63 when the upper frame 11 bends downwardly, but in that case, arrangement space of the power source apparatus 10 is increased by the increased clearance, so that luggage space becomes small.

Hence, the embodiment is constructed so that the joining member 63 has a rigid part 63a for maintaining the arch shape and a flexible part 63b for vertically bending by a load from above and the load is reduced by the flexible part 63b.

The rigid part 63a constructs an upper part extending in substantially a horizontal direction and a middle part extending in substantially a vertical direction of the joining member 63, and includes a rib 63e for holding rigidity and maintaining the arch shape. This rib 63e extends in the horizontal direction in the upper part of the rigid part 63a and extends in the vertical direction in the middle part of the rigid part 63a. That is, in FIG. 2, the portion including the rib 63e of the joining member 63 is the rigid part 63a.

Also, the flexible part 63b constructs the lower end of the joining member 63, that is, the portion connected to the first holding member 61 and the second holding member 62, and does not include a rib for holding rigidity. The flexible part 63b is formed in a strip-shaped flat plate shape without including the rib and also is bent in two bent parts 63c, 63d.

In the flexible part 63b, using the bent part 63c as a boundary, an upper part of the boundary becomes a vertical surface extending in the vertical direction and using the bent part 63d as a boundary, a lower part of the boundary becomes a horizontal surface extending in the horizontal direction, and the portion between the bent part 63c and the bent part 63d becomes an inclined surface.

The flexible part 63b can smoothly bend according to the applied load by the bent parts 63c, 63d and also is constructed so that respective shapes before and after bending are defined.

Consequently, the joining member 63 is configured to maintain the arch shape and hold transverse rigidity by the rigid part 63a and also bend by decreasing longitudinal rigidity by the flexible part 63b.

As a result, when the joining member 63 is subjected to a load from the upper frame 11 of the upper part of the joining member 63, the flexible part 63b bends and thereby the load is reduced and propagation of the load to the first holding member 61 and the second holding member 62 is blocked.

Next, function will be described. In the bus bar module 1 configured as described above, the joining member 63 can maintain the arch shape and hold transverse rigidity by the rigid part 63*a* having the rib 63*e* and also bend by decreasing longitudinal rigidity by the flexible part 63*b* having no rib.

Figure 4:
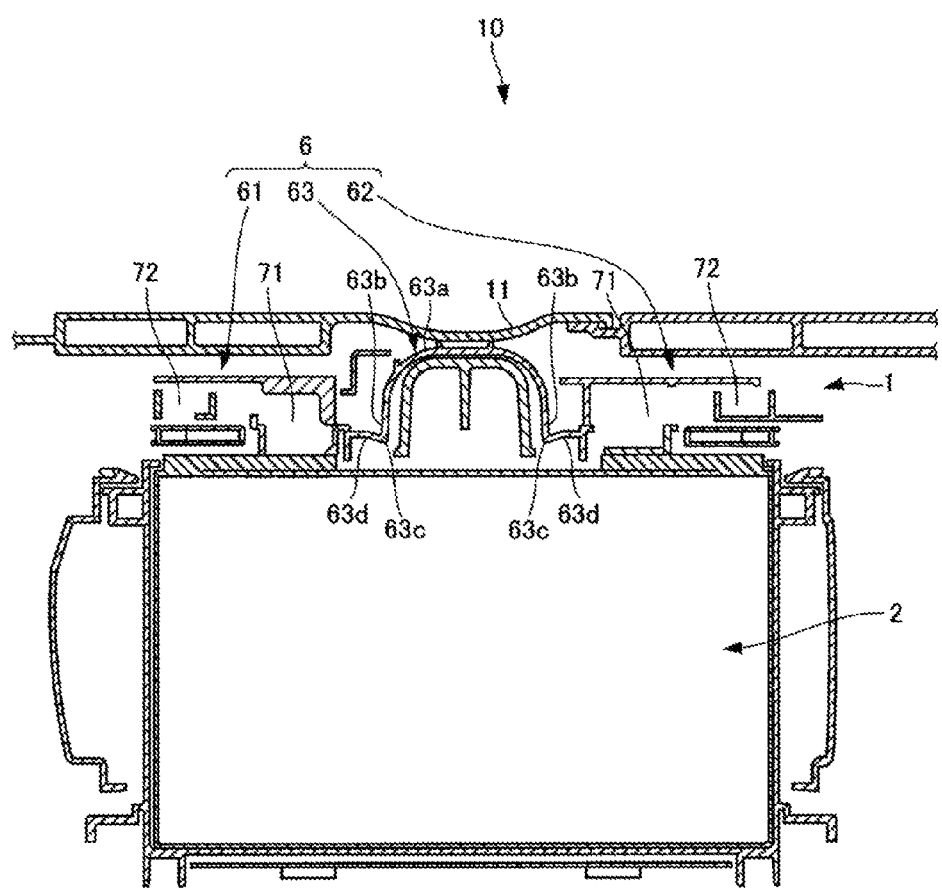
FIG. 4 is a sectional view showing the cross section in the joining member of the bus bar module of FIG. 2 and is a view showing function at the time when the joining member is subjected to a load.

As a result, as shown in FIG. 4, when the joining member 63 is subjected to a load from the upper frame 11, while maintaining the arch shape by the rigid part 63*a,* the load is reduced by bending in the flexible part 63*b* and the load is prevented from being transmitted to the first holding member 61 and the second holding member 62.

Also, since the joining member 63 bends vertically, a force by which the first holding member 61 and the second holding member 62 are displaced in the horizontal direction is not generated and a load in a transverse direction, that is, the direction of arrow X is not applied to the positive electrode 22 and the negative electrode 23 of each of the battery cells 20.

As described above, the embodiment is constructed so that the holding member 6 includes the first holding member 61 for holding the plural bus bars 3 in one electrode line of the plural battery cells 20, the second holding member 62 for holding the plural bus bars 3 in the other electrode line of the plural battery cells 20, and the joining member 63 for structurally joining the first holding member 61 to the second holding member 62, and this joining member 63 is formed in an arch shape upwardly projected from the inside ends of the first holding member 61 and the second holding member 62 and also has the rigid part 63*a* for maintaining the arch shape and the flexible part 63*b* for vertically bending by a load from above.

By this construction, when the joining member 63 is subjected to a load from the upper frame 11, while maintaining the arch shape by the rigid part 63*a,* the load is reduced by bending in the flexible part 63*b* and the load can be prevented from being transmitted to the first holding member 61 and the second holding member 62. Also, since the flexible part 63*b* bends and the load can be reduced, it is unnecessary to increase a clearance between the joining member 63 and the upper frame 11 of the upper part of the joining member 63, so that an increase in installation space can be prevented.

Consequently, an electrode of the assembled battery 2 can be prevented from being deformed or damaged by the load from above without increasing the installation space.

Also, the embodiment is constructed so that the rigid part 63*a* has the rib 63*e* for rigid maintenance and the flexible part 63*b* is formed in a flat plate shape.

By this construction, the rigid part 63*a* includes the rib 63*e* and thereby rigidity can be given to the rigid part 63*a* and also the flexible part 63*b* is formed in the flat plate shape having no rib for rigid maintenance and thereby flexibility can easily be given to the flexible part 63*b.*

Also, the embodiment is constructed so that the flexible part 63*b* is formed on the lower end of the joining member 63.

By this construction, in order to reduce a load in the flexible part 63*b* arranged on the lower end of the joining member 63, the flexible part 63*b* bends vertically and the general arch shape of the joining member 63 can be maintained by the rigid part 63*a.*

As described above, the invention can prevent an electrode of the assembled battery from being deformed or damaged by a load from above without increasing installation space, and is particularly useful in the bus bar module for connecting the plural battery cells of the assembled battery in series.

It is apparent that various modifications can be made in the invention within a scope not deviating from the gist of the invention.

The present invention is useful for providing a bus bar module capable of preventing an electrode of an assembled battery from being deformed or damaged by a load from above without increasing installation space.

What is claimed is:

1. A bus bar module which is mounted in an assembled battery in which plural battery cells are arranged so as to alternately arrange polarities of electrodes and electrically connects mutually adjacent electrodes of the plural battery cells by plural bus bars so that the plural battery cells are electrically connected in series by the plural bus bars, comprising:
   a holding member for holding the plural bus bars with a mutual distance between the bus bars maintained,
   the holding member having:
   a first holding member for holding the plural bus bars in one electrode line of the plural battery cells,
   a second holding member for holding the plural bus bars in the other electrode line of the plural battery cells, and
   a joining member for structurally joining the first holding member to the second holding member,
   wherein the joining member is formed in an arch shape upwardly projected from inside ends of the first holding member and the second holding member, the joining member having a rigid part adapted to maintain the arch shape and a flexible part adapted to vertically bend by a load from above.

2. A bus bar module as claimed in claim 1, wherein the rigid part has a rib for rigid maintenance, and the flexible part is formed in a flat plate shape.

3. A bus bar module as claimed in claim 1, wherein the flexible part is formed on a lower end of the joining member.

* * * * *